ID:
UNITED STATES PATENT OFFICE.

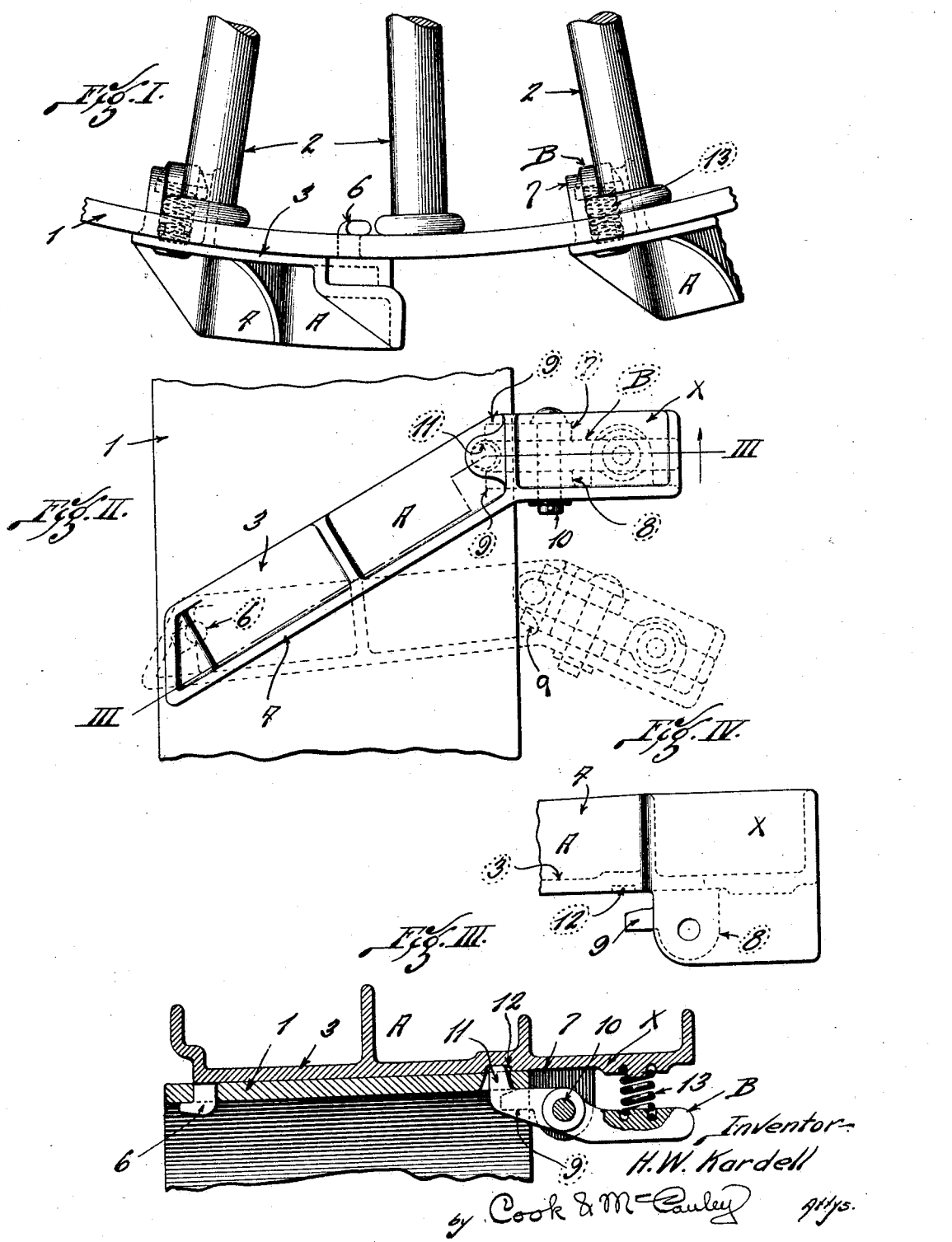

HENRY W. KARDELL, OF UNIVERSITY CITY, MISSOURI, ASSIGNOR TO KARDELL TRACTOR AND TRUCK COMPANY, OF ST. LOUIS, MISSOURI, A CORPORATION OF DELAWARE.

TRACTION WHEEL.

1,408,090.

Specification of Letters Patent.   Patented Feb. 28, 1922.

Application filed April 30, 1920.   Serial No. 377,962.

*To all whom it may concern:*

Be it known that I, HENRY W. KARDELL, a citizen of the United States of America, a resident of University City, in the county of St. Louis and State of Missouri, have invented certain new and useful Improvements in Traction Wheels, of which the following is a full, clear, and exact description, reference being had to the accompanying drawing, forming a part of this specification.

My invention relates to improvements in traction wheels, and more particularly to a wheel provided with traction spurs or lugs. The main features of novelty lie in "quick-detachable" fastening means whereby the traction spurs or lugs are secured to the wheel. The main object of the invention is to produce a strong and simple detachable fastening means securely holding the traction spurs on the wheel, and allowing the spurs to be very easily and quickly attached to and detached from the wheel.

In the preferred form of the invention, the traction spurs are in the form of cleats arranged on the wheel rim, one end of each spur being pivotally interlocked with the rim, and the opposite end being provided with a quick-detachable fastening device, preferably including a spring actuated operating lever, whereby the traction spur is prevented from turning on the pivot. In applying one of the traction spurs to a wheel, it is only necessary to insert one end of the spur through a hole in the rim, thereby providing a pivotal connection, and thereafter, by merely moving the spur on the axis of the pivot, it can be securely attached to the wheel.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Fig. I is a fragmentary view illustrating a portion of a traction wheel embodying the features of my invention.

Fig. II is an enlarged detail view showing a portion of the rim of the wheel and one of the traction spurs, or lugs, mounted thereon.

Fig. III is a section on the line III—III, Fig. II.

Fig. IV is a detail view of one end portion of the traction spur.

The wheel rim herein shown consists of a tread web 1 to which spokes 2 are secured.

A designates traction spurs preferably L-shaped in cross section, each of said spurs having a web 3 engaging the outer face of the wheel rim and a leg 4 extending outwardly from said web, the elements 3 and 4 being reinforced by integral webs 5. Each traction spur is preferably in the form of a cleat, arranged diagonally of the wheel rim and at an angle to the axis of the wheel, and an end portion X extending from one side of the rim. The extended end portion is preferably parallel with the axis of the wheel.

The tread of the rim is preferably perforated to receive projections 6 extending from end portions of the traction spurs so as to interlock said end portions with the wheel rim. Each of the extensions or projections 6 is approximately L-shaped, so that it can be readily inserted through a perforation in the wheel rim and then positioned as shown in Fig. III to engage the inner face of the rim. The extensions 6, preferably formed integral with the traction spurs, pivotally connect said spurs to the wheel, but I preferably utilize other fastening means for preventing the spurs from turning on the pivots.

The extended end portion of each traction spur is provided with a latch holder comprising lugs or projections 7 and 8, each having an extension 9 which normally engages the inner face of thread web 1. A pivot pin 10, removably mounted in the lugs 7 and 8, is arranged at a right angle to the axis of the wheel. A locking lever B, mounted on pivot 10, is arranged between lugs 7 and 8, and provided at its inner end with a locking finger 11 adapted to extend through a hole in the tread web 1 and into a recess 12 formed in the inner face of the traction spur, as shown in Fig. III. The outer end of locking lever B serves as a handle which may be readily engaged and operated to withdraw the locking finger 11. A spring 13 (Fig. III) is interposed between the traction spur and the locking lever, so as to yieldingly hold said lever in its locking position.

By referring to the drawings it will be seen that the elements 7, 8 and 9 of the latch holder are combined with a portion of the traction spur to provide a hook adapted to interlock with the wheel rim. The member 9, forming part of this "hook", normally prevents the traction spur from moving outwardly relative to the outer face of the wheel rim. The elements 7 and 8 provide thrust receiving abutments which engage one side of the rim to receive the service thrusts which tend to turn the traction spur on its pivot 6.

To remove one of the traction spurs from the wheel, the first step consists in operating the lever B to withdraw its locking finger 11 from the hole in the tread web 1, thereby allowing the traction spur to swing on the axis of its pivotal extension 6. The traction spur can then be easily moved to the position shown by dotted lines in Fig. II, wherein the hook elements 9 lie entirely beyond the side face of the wheel rim, and the free end portion of the spur can then be easily manipulated to withdraw the pivotal extension 6 from the wheel rim. To secure one of the traction spurs to the wheel, the pivotal extension 6 is inserted through one of the perforations in the wheel rim and the traction spur is then moved to the position shown by full lines in Figs. II and III, and thereby interlocking both end portions of the spur with the wheel rim, and at the same time moving lever B to the position shown in Fig. III to securely hold the traction spur in interlocking engagement with the rim.

I claim:

1. A traction wheel having a rim, traction spurs in the form of cleats arranged diagonally of the rim, one end of each traction spur being provided with a pivotal extension interlocked with the rim and the opposite end portion being provided with a hook adapted to interlock with the rim, each traction spur being free to move about the axis of its pivotal extension so as to permit its hook to be interlocked with and removed from the rim, and locking levers each cooperating with one of the hooks and one of the pivotal extensions to secure one of said spurs to the wheel.

2. A traction wheel having a rim comprising a tread web, traction spurs in the form of cleats arranged on the tread of the rim, one end of each traction spur being provided with a pivotal extension projecting through and interlocked with said tread web and the opposite end portion being provided with a hook adapted to interlock with one side of said web, each traction spur being free to move about the axis of its pivotal projection so as to permit its hook to be interlocked with and removal from the rim, and detachable fastening devices each located adjacent to one of the hooks and extending into said tread web so as to detachably secure one of said spurs in interlocking engagement with said tread web.

3. A traction wheel having a rim comprising a tread web, traction spurs in the form of cleats arranged diagonally of the rim, one end of each traction spur being provided with a pivotal extension projecting through and interlocked with said tread web and the opposite end portion being provided with a hook adapted to interlock with one side of said tread web, each traction spur being movable about the axis of its pivotal projection so as to permit its hook to be interlocked with and removed from the tread web, and detachable fastening devices each located adjacent to one of the hooks so as to detachably secure one of said spurs in interlocking engagement with said rim, each of said fastening devices comprising a spring actuated lever arranged transversely of the rim and having a locking finger extending into said tread web.

4. A traction wheel having a rim, traction spurs in the form of cleats mounted on said rim, each of said cleats being arranged diagonally of the rim, one end portion of each cleat being extended from one side of the rim and the opposite end portion being pivotally interlocked with the rim, said extended end portion having a thrust-receiving abutment engaging one side of the rim, and a spring-actuated locking lever pivoted to said extended end portion, said locking lever being provided with a latch member whereby the cleat is detachably secured to the rim.

In testimony that I claim the foregoing I hereunto affix my signature.

HENRY W. KARDELL.